(No Model.) 2 Sheets—Sheet 1.

S. E. MOWER.
REGISTERING MECHANISM FOR METERS.

No. 604,174. Patented May 17, 1898.

Witnesses:
Walter E. Lombard
Thomas J. Drummond

Inventor:
Samuel E. Mower,
by Crosby & Gregory
Attys.

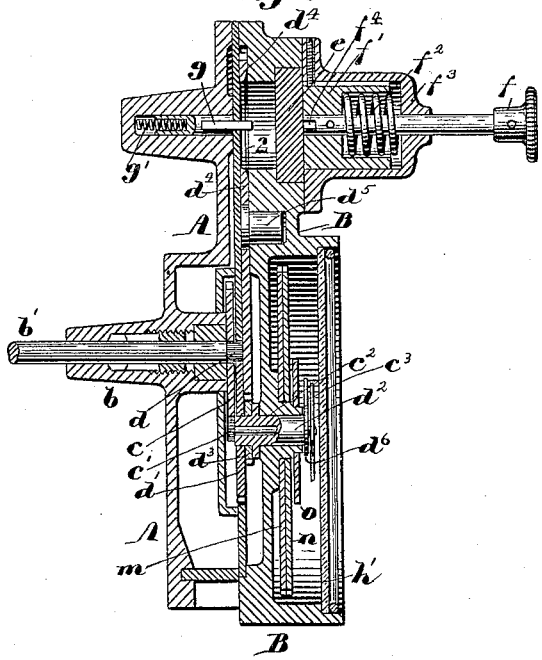
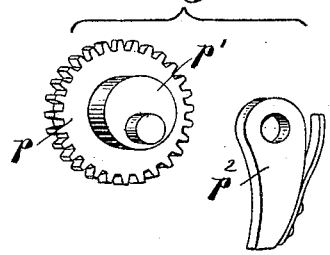

UNITED STATES PATENT OFFICE.

SAMUEL E. MOWER, OF NEW HAVEN, CONNECTICUT, ASSIGNOR TO HENRY G. THOMPSON & SON, OF SAME PLACE.

REGISTERING MECHANISM FOR METERS.

SPECIFICATION forming part of Letters Patent No. 604,174, dated May 17, 1898.

Application filed July 15, 1896. Renewed December 14, 1897. Serial No. 661,885. (No model.)

*To all whom it may concern:*

Be it known that I, SAMUEL E. MOWER, of New Haven, county of New Haven, and State of Connecticut, have invented an Improvement in Registering Mechanism for Meters, of which the following description, in connection with the accompanying drawings, is a specification, like letters and figures on the drawings representing like parts.

This invention has for its object the production of a novel registering mechanism for use in connection with coin-controlled prepayment attachments for meters for measuring gas, fluids, &c.

Figure 1:
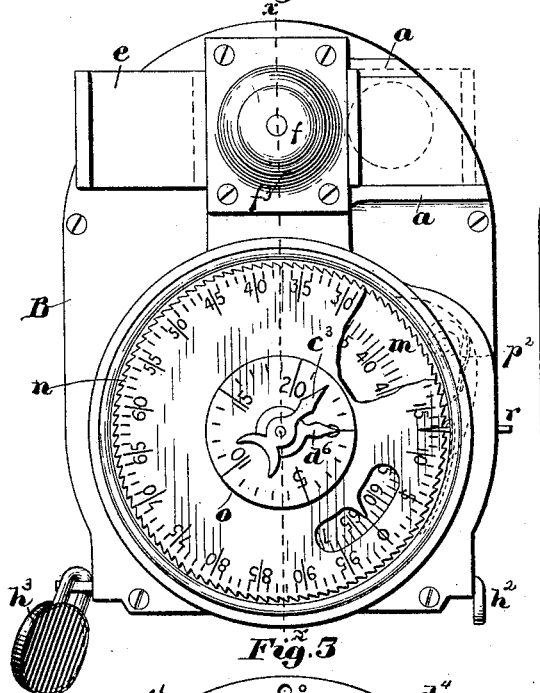
Figure 2:
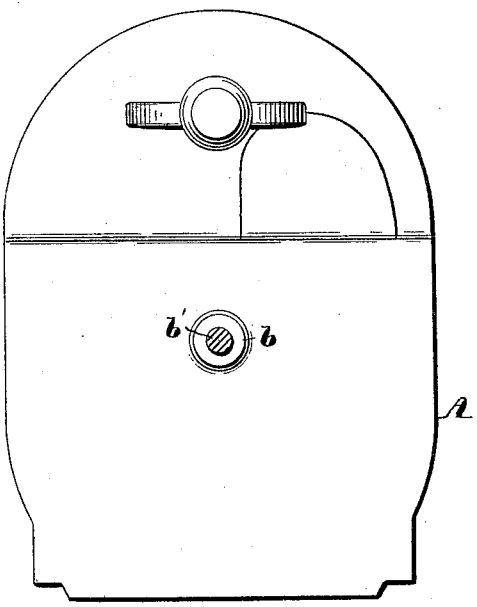
Figure 3:
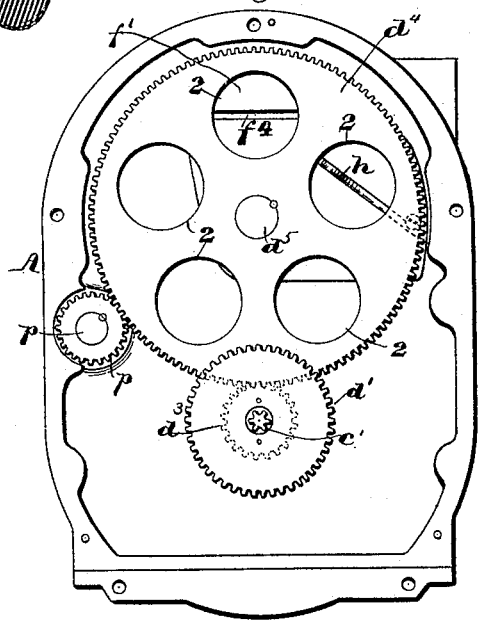
Figure 4:
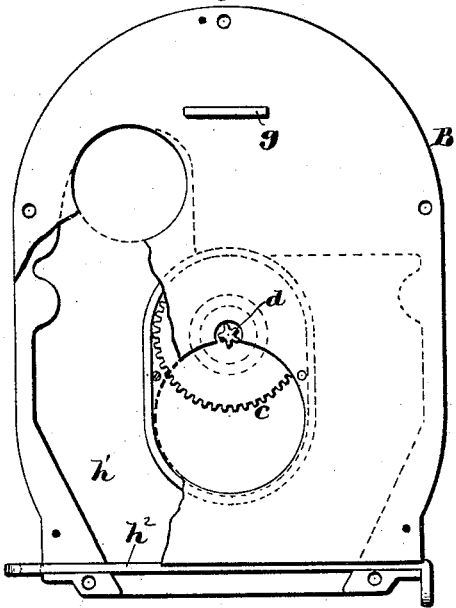

Figure 1, in front elevation, shows a prepayment attachment having a registering mechanism embodying my invention. Fig. 2 is a rear side elevation thereof. Fig. 3 shows the face-plate removed from Fig. 1 and turned to expose its rear side. Fig. 4 shows the inner side of the back plate after removing the face-plate. Fig. 5 is a section in the line $x$, Fig. 1. Fig. 6 shows the coin-feeder $e$ detached. Fig. 7, enlarged, shows the coin-discharger detached; and Fig. 8, enlarged, shows the eccentric stud and pawl.

The framework is composed of a back plate A and a front plate B. The back plate has an extended bearing $b$ for a rotary shaft $b'$, which is rotated from any usual rotatable part of a gas or other meter of usual construction, said shaft being rotated when the gas or other fluid is being measured and delivered. This shaft $b'$ has at its end inside the back plate a gear $c$ and a small pinion $d$, said pinion being herein shown as made by cutting into the end of the shaft $b'$ to leave a series of teeth, and said teeth are prolonged, so that they serve to receive upon them the wheel $c$, the latter being forced onto the teeth of the shaft, so that said teeth engage the edges of the hole in said wheel and serve to hold the wheel in fixed position. The pinion $d$ engages a toothed gear $d'$, fast on a hollow shaft $d^2$, provided with a smaller toothed gear $d^3$, which engages the toothed periphery of and rotates the coin-carrying wheel $d^4$, having a connected stud $d^5$, which has a bearing in a hole made in the rear side of the face-plate. (See Fig. 5.) This coin-carrying wheel, toothed at its periphery, has a series of pockets 2, of a size as herein shown, to receive quarter-dollars, and the said wheel, as above stated, is rotated positively from the shaft $b'$.

The front plate B has suitable projections $a$ $a$, shaped to constitute a guideway for a coin-feeder $e$, (shown detached in Fig. 6,) said coin-feeder having a coin-hole $e'$ and being herein shown as of a thickness equal to the thickness of five quarter-dollar coins, so that when the said coin-feeder is drawn from the position shown in full lines in Fig. 1 to that shown by dotted lines in said figure the coin-hole will be exposed to receive coins—one or more up to five.

To move the coin-feeder, as described, the operator must first engage the handpiece $f$ of the plunger $f'$, normally kept pressed in by a suitable spring $f^2$, said plunger being held in a suitable yoke $f^3$ and having at its inner end a slot $f^4$. When the coin-feeder supplied with coin has been pushed back into the position shown by full lines, Fig. 1, the coins will be stopped immediately opposite the inner end of the plunger, and the latter will act thereon with a spring-pressure and will cause the innermost coin of the pile to enter one of the pockets 2 first to come under it in the carrying-wheel $d^4$, the rear side of the coin in said pocket acting against and pushing back the locking device $g$, (shown as a pin normally pressed forward by a spring $g'$, see Fig. 5), the pressing back of the said locking device by a coin pushing the locking device out of the pocket, releasing the said wheel and letting the shaft $b'$ start the coin-carrying wheel in motion, and its rotation cannot or will not be stopped so long as each pocket following is supplied with coin; but when a pocket comes opposite the locking device without a coin then the locking device enters the coin-hole and stops the wheel and the meter. So long as the coin-feeder has a coin in it the plunger will act automatically to press a coin into each pocket as the latter arrives opposite the coin acted upon by the plunger.

From the foregoing it will be understood that the meter will be free to act and measure and deliver gas, &c., as long as there are coins in the coin-holder or the coin-carrier, and therefore the user of the meter may be sure of the delivery of gas so long as he pays for it in advance.

Each coin taken from the coin-feeder is taken by the coin-carrying wheel and carried nearly back to its starting-point; but as soon as it arrives opposite the coin-discharger $h$ the latter by its cam-shaped end acts on the inner side of the coin and pushes it out of the coin-hole, it dropping into the coin-receptacle $h'$, having, as shown, a removable sliding bottom $h^2$, which may be kept in place by a lock $h^3$, the key to the lock being in the possession of the gas or other company supplying the gas or thing being measured and sold.

The parts so far described constitute a prepayment attachment for use in connection with gas and other meters; but said devices are not herein claimed, for the reason that they form the subject-matter of another application filed by me, Serial No. 656,764, on the 29th day of October, 1897.

This invention relates to the registering mechanism for this prepayment attachment, and to show the consumer the quantity of gas or other thing delivered by the operation of the prepayment attachment above described I have provided the registering mechanism, which I will now describe, it indicating the number of feet of gas delivered. This registering mechanism is also moved positively from the meter-shaft $b'$ by or through the toothed gear $c$ thereon. This gear $c$ engages a small pinion $c'$ on a short shaft $c^2$, extended through the hollow shaft $d^2$ and carrying a hand $c^3$, and under the longer hand is a shorter hand $d^6$, fast on the outer end of the hollow shaft $d^2$.

The face-plate B has a circular cavity covered with a glass $h'$, and inside this cavity there is a hollow hub which serves as a bearing for the shaft $d^2$, the outer side of the hub receiving upon it three dials $m$ $n$ $o$. The dial $o$ is stationary and has twenty-five spaces, each space indicating one twenty-fifth part of twenty-five cents, and consequently each space represents the consumption of one cent's worth of gas. The dial $n$ is shown as divided into one hundred spaces, and it has a tooth for each space, while the inner dial $m$ is supposed to contain one hundred and one teeth, and it is suitably numbered.

The coin-carrying wheel engages a small gear $p$, having a short stud $p'$, which at its end (shown in Fig. 1, see also Fig. 8) has an eccentric on which is mounted a spring-pressed pawl $p^2$, the end of said pawl engaging both said dials $m$ and $n$, said pawl acting to rotate said dials, it rotating the inner dial $m$ for a distance equal to one of its teeth for each complete rotation of the dial $n$.

The position of the dial $n$ may be readily ascertained by the stationary pointer $r$.

In the use of my registering mechanism with a meter each revolution of the longer pointer $c^3$ on the small stationary center dial represents the consumption of two cubic feet of gas, each revolution of the smaller pointer $d^6$ represents the consumption of two hundred cubic feet of gas, and consequently five revolutions of this smaller pointer represents the consumption of one thousand cubic feet of gas, and during this number of revolutions the dial $n$ will have been turned a distance equal to five of its teeth or notches.

Each notch or tooth of the dial $n$ represents consequently two hundred cubic feet of consumption and its entire rotation represents a consumption of twenty thousand feet, and as the dial $m$ is moved but one tooth at each rotation of dial $n$ each tooth of dial $m$ represents twenty thousand feet of consumption, and as the dial $m$ has one hundred and one teeth it represents by a full revolution a consumption of two million and twenty thousand cubic feet.

It will be obvious that the divisions on the dials may be changed and made more or less or the number of dials may be increased and the apparatus may be readily changed to adapt it for the reception of any other coin than that of the value of twenty-five cents, according to the price of the gas or thing to be measured and sold and paid for.

When the pockets are empty and all the coins are exhausted from the feeder, the plunger $f'$ is pushed forward into the pocket and its notch $f^4$ embraces the locking device $g$. If the locking device did not enter the pocket, the coin-carrying wheel would start up as soon as the plunger was pulled out, and the plunger might be kept out and the gas be stolen; but as soon as a coin has been put between the plunger and the locking device the latter is pushed back and releases the carrying-wheel.

Having described my invention, what I claim as new, and desire to secure by Letters Patent, is—

In a registering mechanism for meters, a series of concentric shafts having pointers, and a series of concentric graduated dials having a different number of teeth, the outer dial having an opening through which the graduations on the rear dial can be read, and a pointer, a shaft deriving its motion from the mechanism of a meter, and gearing actuated by said shaft to actuate said shafts and dials, substantially as described.

In testimony whereof I have signed my name to this specification in the presence of two subscribing witnesses.

SAMUEL E. MOWER.

Witnesses:
SAMUEL A. MOWER,
GEO. E. HAIGHT.